United States Patent Office 2,803,058
Patented Aug. 20, 1957

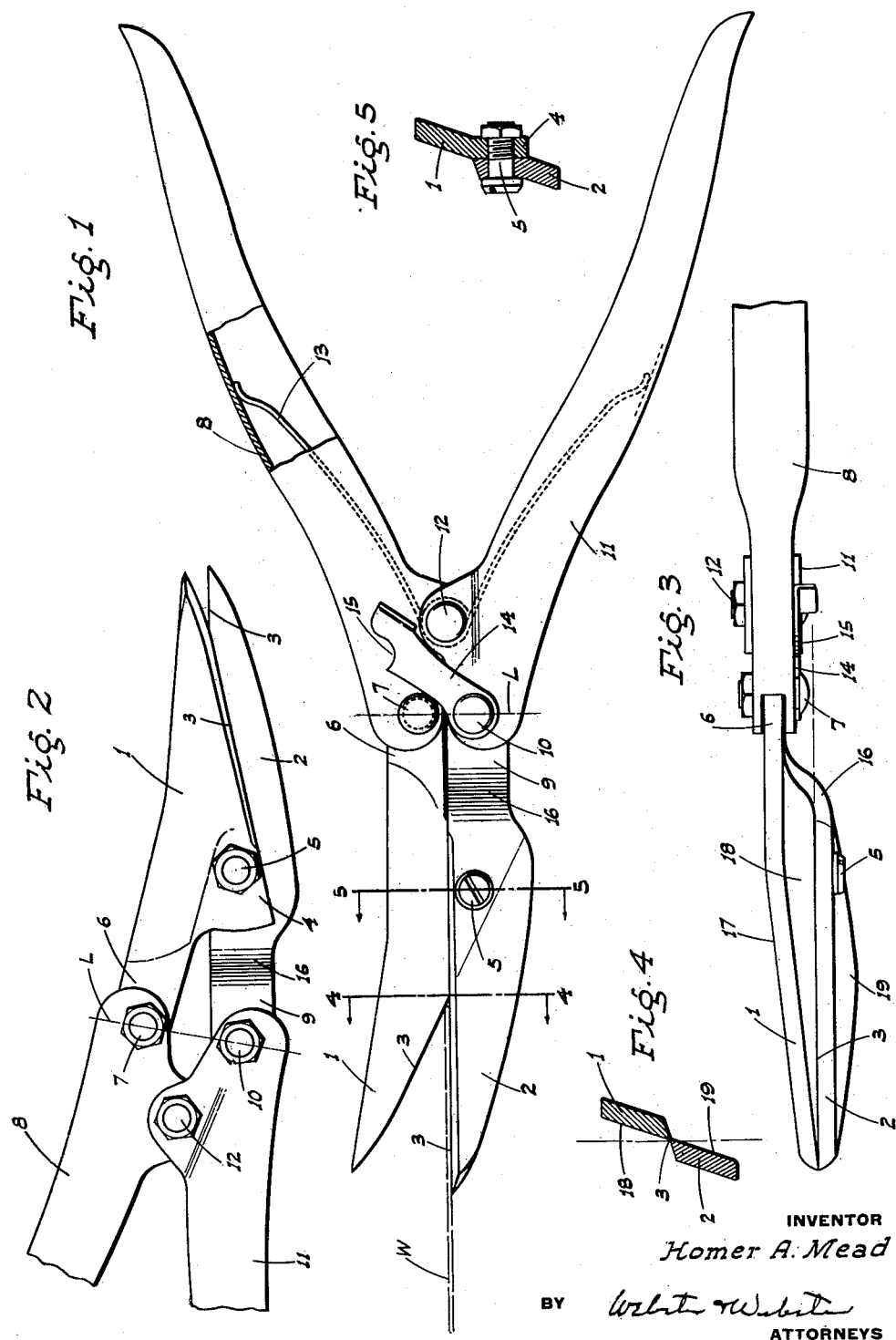

2,803,058
TIN SNIPS

Homer A. Mead, Turlock, Calif.

Application November 7, 1955, Serial No. 545,189

2 Claims. (Cl. 30—252)

This invention relates to hand shears particularly designed for sheet metal cutting, or what are commonly called "tin snips."

Such snips include cooperating blades pivoted together, and handles movable to and from each other for manipulating the blades; and a major object of the invention is to connect the blades and handles with a compound-leverage linkage so that the leverage exerted on the blades is increased as the blades close and the cut advances toward the point or outer end of the blades. This makes for an easier cutting action, and the exertion of less physical effort, than is the case with snips of the ordinary type.

Another object of the invention is to arrange the blades relative to each other and to the handles so that right or left hand turns and cuts may be made with equal facility, and so that no interference by the cut metal with the shanks of the blades will be had regardless of the direction of the cut.

A further object of the invention is to arrange the blades relative to each other so that a minimum spread or bend of the metal along the line of cut is had as the snips cut and move through the metal.

It is also an object of the invention to provide tin snips which are designed for ease and economy of manufacture.

Still another object of the invention is to provide practical, reliable and durable tin snips, and ones which will be exceedingly effective for the purpose for which they are designed.

These objects are accomplished by means of such structure and relative arrangement of parts as will fully appear by a perusal of the following specification and claims.

In the drawings:

Fig. 1 is a side elevation of the snips with the blade wide open; one of the handles being broken out and in section.

Fig. 2 is a fragmentary side elevation of the snip, looking at the opposite side thereof and with the blades nearly closed.

Fig. 3 is a fragmentary top plan view of the snips.

Fig. 4 is a cross section on line 4—4 of Fig. 1.

Fig. 5 is a cross section on line 5—5 of Fig. 1.

Referring now more particularly to the drawings, and to the characters of reference marked thereon, the shears or snips comprise upper and lower blades 1 and 2, so designated both for convenience of description, and because the tool is normally operated in a generally horizontal position, with the blade 2 lowermost or below the work W, as shown in Fig. 1. Each blade includes a cutting edge 3 arranged in cooperating side by side relation with each other.

The rear end portion of blade 1 always overlaps the corresponding portion of blade 2 and is formed with a pivot-mounting boss 4 flatly engaging corresponding portion of blade 2, the contacting faces of the boss and portion of blade 2 lying in a vertical plane, as shown in Fig. 5. The blades are pivotally connected together by a pivot bolt 5 through blade 2 and said boss 4.

Such blade 1 is formed with a relatively short shank 6 pivoted at its rear end, as at 7, on the forward end of a rearwardly projecting upper handle 8. The blade 2 is also formed with a relatively short shank 9 whose upper edge is alined with the edge 3 of blade 2 and which is pivoted, as at 10, on the forwardly projecting handle 11. The shanks thus do not cross each other. The handles are pivoted together, as at 12, at a point relatively adjacent but rearwardly of pivots 7 and 10.

When the handles are fully spread apart therefore, the blades are opened as far as possible, as shown in Fig. 1. The shanks are then substantially parallel to each other lengthwise of the tool, the pivots 7 and 10 are at their point of maximum approach to each other, pivots 10 and 5 are in substantial alinement lengthwise of the tool, and pivot 12 is the maximum distance possible rearwardly of a line L drawn through pivots 7 and 10.

The distance between the center of pivots 7 and 10 and handle pivot 12 is the same, and is less than the distance between said pivots 7 and 10 and the blade pivot 5, so as to provide better leverage in all cases. As the handles are brought together, and the blades move toward a closed position, and the cut through the work moves toward the point end of the blades, the pivots 7 and 10 become separated, and pivot 12 moves closer to line L, as indicated in Fig. 2. The leverage and power applied to the work at the point of cut is therefore increased, thereby offsetting the loss of power otherwise caused by the increased distance of said point of cut to pivot 5.

It will also be seen that as the blades and handles move toward a closed position, the pivot 12 of the handles moves above and clear of the longitudinal edge of the lower shank 9 and the cutting edge of the corresponding blade 2, as shown in Fig. 2. The metal along the line of cut can therefore pass to the rear of said pivot 12 without interference.

In order to facilitate operation of the snips, a suitable spring 13 extends between the handles, tending to separate the same and maintain the blades spread or open. In order to maintain the handles and blades closed, when the tool is not being used, a finger actuated latch plate 14 is turnably mounted on pin 10, having a notch 15 at its outer end for releasable engagement with pivot 7, such engagement being only possible when the handles are closed and the pivots 7 and 10 separated.

The straight cutting edge 3 of the lower blade 2 extends in a plane lenghtwise of the tool, but in laterally offset relation to the handles sufficient to cause the cut edge of the work to clear pivot 10, and the adjacent portion of the handle 11, as indicated in Fig. 3. The shank 9 of said blade 2 is therefore formed with a lateral offset 16, as shown.

The cooperating edge 3 of the upper blade is of course similarly offset, but shank 6 of said blade is vertically alined with the rear end of shank 9, and the blade 1 itself extends on a gradual lateral slope from said shank, as indicated at 17, to the outer end of the corresponding edge 3. This causes the blade itself to have a lateral slope relative to a vertical longitudinal plane from its cutting edge to its upper edge in a direction opposite or away from the blade 2, as shown at 18.

The blade 2 similarly is formed with a lateral slope relative to a vertical plane from its cutting edge downwardly, in a direction away from blade 2, as shown at 19.

By reason of this blade arrangement, the metal of the work—along the line of cut—is deflected with a minimum of spread when making a right turn, and such metal raises over and passes by the upper shank without interfering with the handle linkage. Non-interference is also of course obtained when making a left-turn cut.

It will be noted that the lateral slope of the blades, which leaves boss 4 and the boss-contacted portion of blade 2 undisturbed or in a vertical plane, extends beyond or to the rear of the pivot pin until such slope merges into or terminates at the shanks as indicated. This feature is of material assistance in obtaining the above described metal-deflecting result.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tin snips comprising upper and lower blades having coperating cutting edges, the cutting edge of the lower blade being straight, a pivot pin extending through and connecting the blades together adjacent their rear end and disposed below the cutting edge of the lower blade, a shank adapted for handle connection projecting rearwardly from the upper blade substantially parallel to and offset a material distance throughout its length to one side of the cutting edges of the blades, and another shank adapted for handle connection projecting rearwardly from the lower blade and whose upper edge is on a level with the cutting edge of said blade and having a laterally offset bend in the direction of the first named shank from an inception adjacent the pivot means and so as to lie directly below said first named shank; the upper blade being mainly deflected laterally from its cutting edges in the direction of the corresponding shank.

2. A tin snips comprising upper and lower blades having cooperating cutting edges, a pivot pin connecting the blades together adjacent their rear end, a shank adapted for handle connection projecting rearwardly from the upper blade substantially parallel to and offset a material distance throughout its length to one side of the cutting edges of the blades; a shank adapted for handle connection projecting rearwardly from the lower blade and having a laterally offset bend in the direction of the first named shank from an inception adjacent the pivot means and so as to lie directly below the first named shank; the blades at their rear end having flat contacting bosses through which the pivot pin projects, the contacting faces of the bosses lying in a plane parallel to the vertical plane of the shanks, the lower edge of the boss of the upper blade extending to its rearward termination as a straight continuation of the cutting edge of said blade while the upper edge of the boss of the lower blade extends to its rear termination as a straight continuation of the cutting edge of said lower blade, the lower edge of the shank of the upper blade being above the cutting edge of the lower blade; the blades except for the bosses being laterally deflected in parallel relation from their cutting edges in the direction of the offset of the shanks.

References Cited in the file of this patent

UNITED STATES PATENTS

| | | |
|---|---|---|
| 1,137,687 | Wright | Apr. 27, 1915 |
| 1,446,540 | Bernard | Feb. 27, 1923 |
| 1,524,723 | Wagenbach | Feb. 3, 1925 |
| 1,909,846 | Porter | May 16, 1933 |
| 2,078,585 | Rauh | Apr. 27, 1937 |
| 2,136,414 | Clements | Nov. 15, 1938 |
| 2,179,732 | Scanlon | Nov. 14, 1939 |
| 2,191,236 | McDonald | Feb. 20, 1940 |
| 2,264,840 | Isaac | Dec. 2, 1941 |
| 2,287,303 | Habart et al. | June 23, 1942 |
| 2,680,294 | Shoffner | June 8, 1954 |

FOREIGN PATENTS

| | | |
|---|---|---|
| 368,489 | France | Oct. 8, 1906 |
| 800,564 | France | May 4, 1936 |
| 1,047,245 | France | July 22, 1953 |